Mar. 3, 1925. Re. 16,011

P. SIMON

COOKING UTENSIL

Original Filed Feb. 9, 1922

INVENTOR
PETER SIMON
BY Alexander Chessin
ATTORNEY

Reissued Mar. 3, 1925. Re. 16,011

UNITED STATES PATENT OFFICE.

PETER SIMON, OF BINGHAMTON, NEW YORK, ASSIGNOR TO PERFECT UTENSIL CORPORATION, OF NEW YORK, N. Y., A CORPORATION OF NEW YORK.

COOKING UTENSIL.

Original No. 1,445,457, dated February 13, 1923, Serial No. 535,330, filed February 9, 1922. Application for reissue filed November 28, 1924. Serial No. 752,825.

*To all whom it may concern:*

Be it known that I, PETER SIMON, a citizen of Czechoslovakia, residing at Binghamton, in the county of Broome and the State of New York, have invented certain new and useful Improvements in Cooking Utensils, of which the following is a specification.

This invention relates to cooking utensils and has particular reference to a cooking vessel embodying an inner and an outer container, the wall of the inner container being provided with a plurality of perforations to permit free circulation of fluid from one container to the other.

One of the objects of the invention resides in the provision of a cooking vessel embodying an inner and an outer container with devices for holding the containers in spaced relation, the inner container being provided with a plurality of perforations, while cooperating devices carried by the two containers permit the inner container to be supported in an elevated position within the outer container and also removing the contents thereof without the necessity of entirely removing the inner container from the outer container. Another object of the invention is to permit the draining of the fluid through the perforations in the inner container while the latter is supported in the elevated position. Still another object is to prevent the bottom of the inner container from touching the bottom of the outer container. Other objects will become apparent from the description of the invention which follows.

Figure 1:
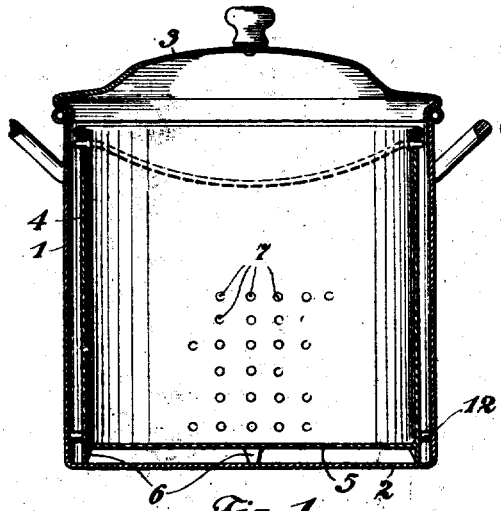
Figure 3:
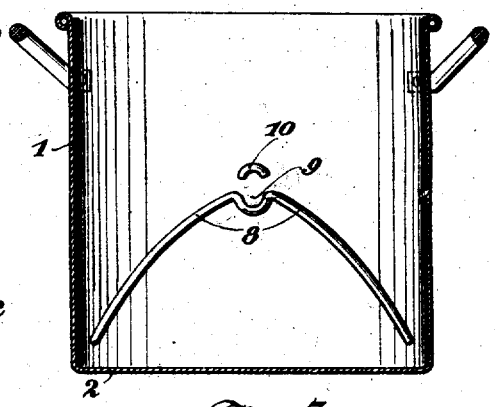
Figure 4:
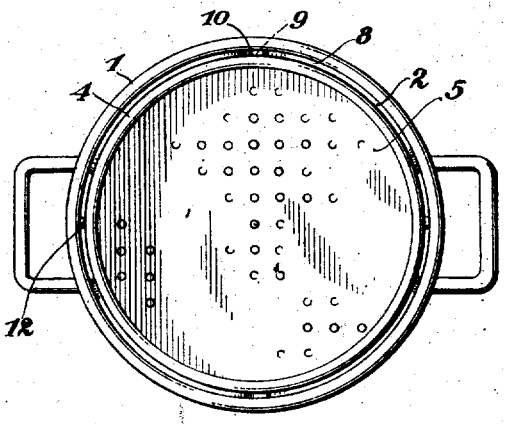
Figure 2:
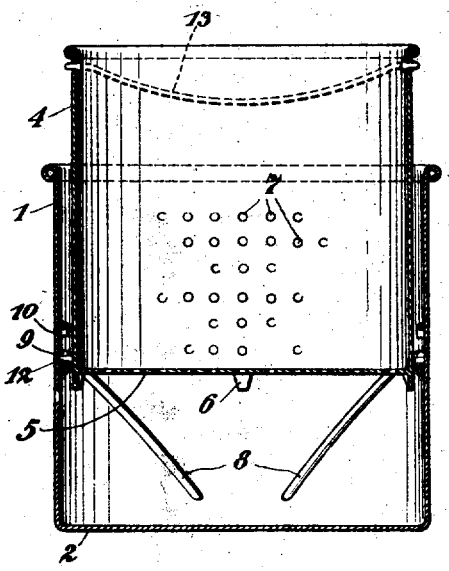
Figure 5:
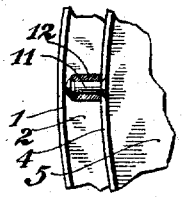

In the drawing, Figure 1 is a vertical cross sectional view of a cooking utensil constructed in accordance with the present invention showing the inner container having supporting feet resting on the bottom of the outer container. Figure 2 is a cross sectional view similar to Fig. 1, with cover removed, showing the inner container raised to its elevated position and supported by cooperating devices carried by the two containers. Figure 3 is a cross sectional view of the outer container showing the upwardly converging guides on the side wall thereof for supporting the inner container in an elevated position. Figure 4 is a top plan view of the utensil with cover removed. Figure 5 is a detail sectional view showing the supporting pins carried by the inner container for engaging the guides on the outer container.

Referring to the drawing more in detail, there is illustrated a cooking utensil embodying a container having a cylindrical side wall 1 and a bottom wall 2, with a cover 3 removably mounted thereon. A second container embodying a cylindrical side wall 4 and a bottom wall 5 is disposed within the first or outer container and retained in spaced relation thereto by the supporting feet 6 carried by the bottom 5 of the second or inner container. As illustrated, the side and bottom walls of the inner container are provided with a plurality of perforations 7 to permit the free circulation of fluid from the outer receptacle to the inner one. Means is provided for holding the inner receptacle in an elevated position, comprising a pair of diametrically opposite upwardly converging guides formed by projections on the inner face of the wall 1, each guide embodying a pair of inclined arcuate members 8 formed into a seat 9 at the meeting point or apex thereof, and a guard 10 on the inner face of wall 1, overlying the seat 9, as is clearly shown in Figs. 2 and 3. The projecting guides 8 may be ribs or indentations in the wall 1, or of other suitable construction. As shown in Fig. 5, a pin 11 projects laterally of the inner container wall 4 adjacent the lower end thereof, the pin 11 being provided with a rotatable collar 12 for the purpose of reducing friction between the relatively moving parts when the pins 11 ride upon the guide members 8, two such pins being provided at diametrically opposite points of the inner container.

With the inner container in the position shown in Fig. 1, the cover 3 of the outer container is removed, and the handle or bale 13 carried by the inner container is grasped to slightly elevate the inner container and position the pins 11 for engagement with their respective guide members 8. It will be understood that when the inner container is in the position where the feet 6 are resting on the bottom of the outer container, a slight elevating movement and rotation of the inner container in either direction will cause the pins 11 to ride upon the adjacent sides of the guide members 8 to bring the inner container to an elevated position, this arrangement eliminating the necessity of vertically lifting the inner container when the same is heavily laden, the rotation of the inner container greatly facilitating the elevating movement thereof. Continued rotation of the inner container will cause the pins to ride upon the guide members 8 until the same reach the apices thereof, while the guards 10 prevent accidental disengagement or removal of the inner receptacle from the outer receptacle when the former is supported in an elevated position. The inner container may be readily removed from the outer receptacle by disposing the pins 11 laterally of the guards 10 or otherwise.

The utensil is adapted for various uses, such as cooking or washing clothes, particularly where it is desired to space the contents of the inner receptacle from the walls of the outer container, the perforations of the inner receptacle providing for free circulation of fluid. When the device is used as a cooking utensil, the inner container may be raised to its elevated position and permit water contained therein to drain through the perforations, while, when used to wash clothing, the same operation will cause excess water to be drained off.

While there is herein shown and described the preferred embodiment of the present invention, it is nevertheless to be understood that various changes may be made therein without departing from the spirit and scope thereof.

I claim:

1. In a vessel of the type described, an inner and an outer container, the inner container having a plurality of perforations over the side and bottom walls thereof, upwardly converging diametrically opposite guides on the inner wall of said outer container, and laterally projecting pins carried by said inner container and adapted to ride upon said guides during the elevation of said inner container, the apices of said guides having depressions therein for supporting said pins to maintain said inner container in an elevated position.

2. In a vessel of the type described, an inner and an outer container, the inner container having a plurality of perforations over the side and bottom walls thereof, upwardly converging diametrically opposite guide rails on the inner wall of said outer container, laterally projecting pins carried by said inner container and adapted to ride upon said guide rails during the elevation of said inner container, the apices of said guide rails having depressions therein for supporting said pins, to maintain said inner container in an elevated position, and guard lugs carried by said outer container overlying said depressions, to prevent removal of said inner container from said outer container.

3. In a cooking utensil of the type described, an inner and an outer container, cooperating devices on the adjacent faces of said containers adapted to cause the elevation of said inner container when said inner container is rotated in either direction, said cooperating devices including guides on the inner wall of said outer container, and pins laterally projecting from said inner container.

4. In a cooking utensil of the type described, an inner and an outer container, cooperating devices on the adjacent faces of said containers adapted to cause the elevation of said inner container when said inner container is rotated, said cooperating devices including upwardly converging guides on the inner face of said outer container, and pins on said inner container, each one of said guides having a seat at its upper point to receive said pins, to hold said inner container in an elevated position.

5. In a vessel of the type described, an inner and outer container, means for holding said inner container in a position where its bottom is slightly above the bottom of said outer container, diametrically opposite upwardly converging guide rails on the inner wall of said outer container, pins on said inner container cooperating with said guide rails when said inner container is elevated from said position to a higher position by imparting a rotary motion to said inner container, and means for holding said inner container in said higher position.

6. In a vessel of the type described, an inner and an outer container, diametrically opposite upwardly converging guides on the inner wall of said outer container, and means on said inner container cooperating with said guides to cause upward motion of said inner container when a rotary motion is imparted thereto.

7. In a vessel of the type described, an inner and an outer container, means for holding said inner container in a first position where its bottom is above the bottom of said outer container, means for holding said inner container in a second position substantially above said first position, and means for freely guiding said inner container from one of said positions to the other by imparting a rotary motion thereto in either direction.

8. In a cooking utensil of the type described, an inner and an outer container, diametrically opposite upwardly converging guides on the wall of one of said containers, and pins projecting from the other one of said containers adapted to ride on said guides.

9. In a cooking utensil of the type described, an inner and an outer container, guides on the wall of one of said containers, and means on the other one of said containers cooperating with said guides to cause elevation of said inner container when a rotary motion is imparted thereto in either direction.

PETER SIMON.